(12) United States Patent
Hwang et al.

(10) Patent No.: US 8,923,193 B2
(45) Date of Patent: Dec. 30, 2014

(54) LOW POWER RADIO DEVICE AND RADIO RESOURCE SHARING METHOD FOR LOW POWER RADIO DEVICE

(75) Inventors: Hyo Sun Hwang, Seoul (KR); Nak Myeong Kim, Seoul (KR); Chi Sung Bae, Yongin-si (KR); Young Jun Hong, Seoul (KR)

(73) Assignee: Samsung Electronics Co., Ltd., Suwon-si (KP)

( * ) Notice: Subject to any disclaimer, the term of this patent is extended or adjusted under 35 U.S.C. 154(b) by 250 days.

(21) Appl. No.: 13/408,428

(22) Filed: Feb. 29, 2012

(65) Prior Publication Data

US 2013/0021967 A1 Jan. 24, 2013

(30) Foreign Application Priority Data

Jul. 22, 2011 (KR) .......................... 10-2011-0073023

(51) Int. Cl.
*H04W 16/14* (2009.01)
*H04W 28/04* (2009.01)
*H04W 28/18* (2009.01)
*H04L 12/40* (2006.01)
*H04W 74/08* (2009.01)

(52) U.S. Cl.
CPC ............ *H04W 16/14* (2013.01); *H04W 28/044* (2013.01); *H04W 74/0808* (2013.01); *H04W 74/0891* (2013.01); *Y02B 60/50* (2013.01)
USPC .............. 370/328; 370/235; 370/310; 455/68

(58) Field of Classification Search
USPC ......... 370/235, 280, 329, 350, 337, 338, 394, 370/314, 445; 455/68
See application file for complete search history.

(56) References Cited

U.S. PATENT DOCUMENTS

| | | | |
|---|---|---|---|
| 2005/0058151 A1* | 3/2005 | Yeh .............................. | 370/445 |
| 2005/0063348 A1* | 3/2005 | Donovan ...................... | 370/338 |
| 2005/0157747 A1* | 7/2005 | Yang et al. ................... | 370/465 |
| 2005/0185628 A1* | 8/2005 | Watanabe et al. ............ | 370/347 |
| 2006/0193274 A1* | 8/2006 | Yamagata ..................... | 370/310 |
| 2007/0019665 A1* | 1/2007 | Benveniste ................... | 370/445 |
| 2007/0058575 A1* | 3/2007 | Kwon et al. ................. | 370/318 |
| 2007/0058581 A1* | 3/2007 | Benveniste ................... | 370/328 |
| 2007/0058661 A1* | 3/2007 | Chow ........................... | 370/445 |
| 2007/0230389 A1* | 10/2007 | Amann et al. ............... | 370/314 |
| 2008/0089261 A1* | 4/2008 | Wentink ....................... | 370/311 |
| 2008/0144493 A1* | 6/2008 | Yeh .............................. | 370/230 |
| 2008/0310488 A1* | 12/2008 | Godfrey ....................... | 375/219 |
| 2009/0161540 A1* | 6/2009 | Zaki et al. .................... | 370/230 |
| 2009/0225876 A1* | 9/2009 | Sung et al. ................... | 375/260 |
| 2010/0265895 A1* | 10/2010 | Bracha ......................... | 370/329 |

\* cited by examiner

*Primary Examiner* — Andrew Lai
*Assistant Examiner* — John Lequang
(74) *Attorney, Agent, or Firm* — NSIP Law

(57) ABSTRACT

A low power radio device and a radio resource sharing method for the low power radio device are provided. In the low power radio device, a channel state (CS) is detected by carrier sensing before transmission of each frame to reduce interference and a need of retransmission of each frame, accordingly, reducing energy consumption.

24 Claims, 5 Drawing Sheets

LOW POWER RADIO DEVICE AND RADIO RESOURCE SHARING METHOD FOR LOW POWER RADIO DEVICE

CROSS-REFERENCE TO RELATED APPLICATION(S)

This application claims the benefit under 35 U.S.C. §119(a) of Korean Patent Application No. 10-2011-0073023, filed on Jul. 22, 2011, in the Korean Intellectual Property Office, the entire disclosure of which is incorporated herein by reference.

BACKGROUND

1. Field

The following description relates to a radio resource sharing method for a low power radio device and a radio resource sharing method for the low power radio device.

2. Description of Related Art

In an industrial scientific and medical equipment (ISM) band such as 2.4 GHz, various radio devices having different powers co-exist using different wireless connection protocols. Some devices operate in wireless connection protocols with a high power level, such as a wireless local access network (WLAN), and, therefore, have a relatively long communication distance of about 100 m. Other devices operate using wireless connection protocols with a low power level, such as Bluetooth or Zigbee, and, therefore, have a relatively short communication distance of about 10 m or less. Also, a wireless personal area network (WPAN) or a wireless body area network (WBAN) using low power or ultra-low power may be included.

In such a wireless environment, transmission signals of a low power radio device, which may be any type of electronic device, wired or wireless, operating using a wireless connection protocol with a low power level, may not be recognizable due to a high power radio device that uses a relatively higher power level. The high power radio device may be any type of electronic device, wired or wireless, operating using a wireless connection protocol with a high power level. That is, even when the low power radio device is transmitting data, when an intensity of the transmission signals of the low power radio device is extremely low, a wireless channel state may be considered to be idle during carrier sensing by the high power radio device.

Therefore, when the low power radio device shares radio resources, the transmission signals of the low power radio device may collide and interfere with signals of other radio devices.

SUMMARY

In one general aspect, an apparatus for sharing contents includes a radio resource sharing method for a low power radio device in a wireless environment. The method includes buffering a plurality of frames being continuously transmitted. The method includes detecting a state of a radio resource corresponding to a next frame in a medium interframe space (MIFS). The radio resource is used after transmitting a frame of the plurality of frames. The method also includes transmitting the next frame using the radio resource when the state of the radio resource corresponding to the next frame is idle in the MIFS.

The detecting of the state of the radio resource may include detecting the state of the radio resource with respect to each frame.

The radio resource sharing method may further include standing by until the state of the radio resource becomes idle when the state of the radio resource corresponding to the next frame is busy in the MIFS.

The radio resource sharing method may further include setting the MIFS.

The setting of the MIFS may include setting the MIFS using a minimum and a maximum of an interframe space according to a wireless connection protocol interfering with the wireless environment.

The radio resource sharing method may further include setting the MIFS by further considering a margin time for recognizing a change in the state of the radio resource in addition to the minimum of the interframe space.

The setting of the MIFS may further include determining the minimum and the maximum of the interframe space by considering an influence on the wireless environment by an interference of wireless connection protocols when the number of wireless connection protocols influencing interference on the wireless environment is at least two.

The determining of the minimum and the maximum of the interframe space may include determining the minimum and the maximum using a weight based on the influence on the wireless environment by the interference of the wireless connection protocols.

The determining of the minimum and the maximum of the interframe space may include setting different weights with respect to the respective wireless connection protocols. The determining of the minimum and the maximum of the interframe space may also include calculating a minimum mean value and a maximum mean value of the interframe space based on the different weights. The determining of the minimum and the maximum of the interframe space may further include setting the minimum mean value and the maximum mean value of the interframe space as the minimum and the maximum of the interframe space.

The radio resource sharing method may further include setting an interframe space in response to the frames being continuously transmitted in the wireless connection protocols as the minimum of the interframe space.

The radio resource sharing method may further include setting an interframe space as the maximum of the interframe space in response to a low power radio device and a high power radio device competing to acquire the radio resource in the wireless connection protocols.

The radio resource sharing method may further include varying the weight according to a change in the wireless environment.

In another general aspect, an apparatus for sharing contents includes a low power radio device in a wireless environment, the low power radio device including a buffer unit configured to buffer a plurality of frames being continuously transmitted. The low power radio device also includes a detection unit configured to detect a state of a radio resource corresponding to a next frame in a medium interframe space (MIFS). The radio resource is used after transmission of a frame of the plurality of frames. The low power radio device further includes a transmission unit configured to transmit the next frame using the radio resource when the state of the radio resource corresponding to the next frame is idle in the MIFS.

The detection unit may detect the state of the radio resource with respect to each frame.

The low power radio device may further include a stand-by unit to stand-by until the state of the radio resource becomes idle when the state of the radio resource corresponding to the next frame is busy in the MIFS.

The low power radio device may further include a set unit to set the MIFS.

The set unit may set the MIFS using a minimum and a maximum of an interframe space according to the wireless connection protocol interfering with the wireless environment.

The set unit may further include a determining unit to determine the minimum and the maximum of the interframe space by considering an influence on the wireless environment by an interference of wireless connection protocols when a number of wireless connection protocols influencing interference on the wireless environment is at least two.

The determining unit may be further configured to determine the minimum and the maximum of the interframe space using a weight based on the interference influenced by the wireless connection protocols in the wireless environment.

A radio resource sharing method in a low power radio device, includes detecting a state of a radio resource corresponding to a next frame in a medium interframe space (MIFS). The radio resource is used after transmitting one of the frames. In response to the state of the radio resource being idle in the MIFS, the method includes transmitting the next frame using the radio resource. In response to the state of the radio resource being busy in the MIFS, the method includes placing the state of the radio resource to be on stand-by until the state of the radio resource is idle.

A low power radio device in a wireless environment, including a detection unit configured to detect a state of a radio resource corresponding to a next frame in a medium interframe space (MIFS), wherein the radio resource is used after transmitting one of the frames. The lower power radio device also includes a transmission unit configured to transmit the next frame using the radio resource in response to the state of the radio resource being idle in the MIFS, and configured to place the state of the radio resource to be on stand-by until the state of the radio resource is idle in response to the state of the radio resource being busy in the MIFS.

Other features and aspects will be apparent from the following detailed description, the drawings, and the claims.

Figure 1:
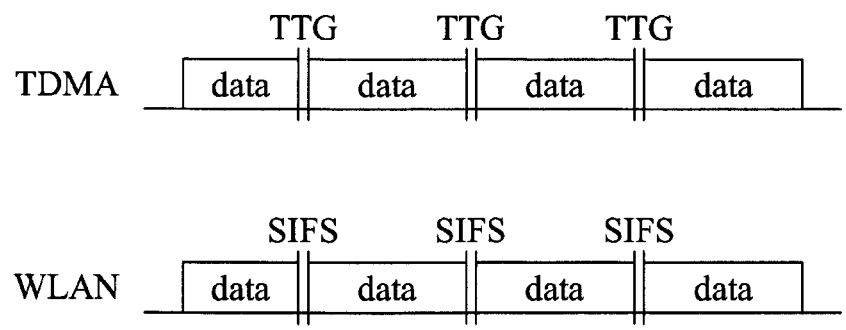
FIG. 1 is a diagram illustrating a method to continuously transmit frames, according to a conventional communication protocol.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a method to continuously transmit frames according to a conventional communication protocol. Referring to FIG. 1, the frames are continuously transmitted in a radio transmission system based on time division multiple access (TDMA) or carrier sense multiple access/collision avoidance (CSMA/CA).

In general, a radio transmission system or a radio device transmits data or frames stored in a buffer or memory when acquiring radio resource through a designated medium access control (MAC) protocol. In a case that a size of the data to be transmitted is greater than a maximum payload, the data may be fragmented and then transmitted.

Once the radio transmission system acquires a radio resource, in a competitive or non-competitive manner, the radio transmission system may perform frame transmission using the radio resource according to time or quantity designated in a predetermined frame interval, such as a transmit to transmit gap (TTG) or short interframe space (SIFS).

Here, among the radio devices, competition exists only regarding a point of transmission time of a first frame. Therefore, once acquiring the radio resource through competition, the radio device may share and freely use the acquired radio resource.

However, as aforementioned, low power radio devices are likely to fail in the transmission due to signals or interference signals of other radio devices that fail to recognize transmission signals of the low power radio devices. Accordingly, a method for the low power radio devices to transmit frames without being affected by the interference is demanded.

Figure 2:
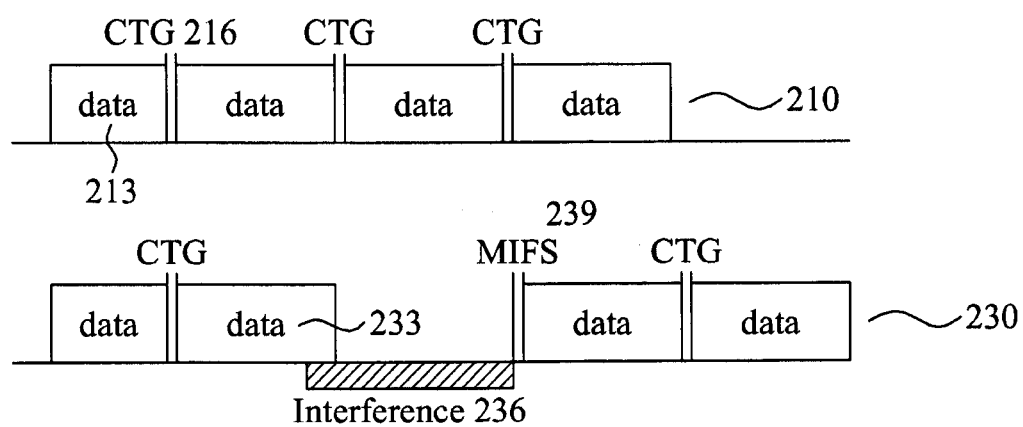
FIG. 2 is a diagram illustrating a method to continuously transmit frames in an example of a radio resource sharing method for a low power radio device.

FIG. 2 illustrates a method to continuously transmit frames of a radio resource sharing method for a low power radio device, according to an illustrative example.

The low power radio device transmits data with a minimized duty cycle so as to reduce energy consumption or increase the energy, efficiency. Therefore, the low power radio device is converted to a wakeup state to transmit data stored in a memory or buffer during a sleep state.

In addition, because the low power radio device has a relatively short transmission frame compared to a high power radio device, data stored in the buffer may be transmitted in the form of fragmented frames. Furthermore, the low power radio device has a relatively low signal intensity compared to the high power radio device. Therefore, the transmission signals of the low power radio device may not be recognizable due to the high power radio device. Accordingly, even when the low power radio device shares the radio resource, the transmission signals of the low power radio device may collide with transmission signals or interfere with signals of other devices, particularly, the high power radio devices, at any time.

As a consequence, in one illustrative example, the low power radio device may be configured to have a higher transmission error rate than the high power radio device when using the same wireless connection protocol as the high power radio device. Accordingly, a retransmission rate and energy consumption of the low power radio device may also increase.

Therefore, as an example, a radio resource sharing method for the low power radio device is provided. The radio resource sharing method may be applicable to both, when no interference occurs as in 210 of FIG. 2 and when an interference occurs as in 230. A transmission time point, or a point in time in which a transmission of a frame or data begins, may be adjusted according to a state of a radio resource during transmission of consecutive frames.

By adjusting the transmission time point according to a state of the radio resource detected by carrier sensing and the like, the low power radio device may reduce the retransmission rate and energy consumption.

As aforementioned, 210 in FIG. 2 illustrates a method transmitting consecutive frames in an environment without interference. In the absence of interference, after at least one of the data or frame 213 included in the consecutive frames are transmitted, next data or frame may be transmitted in the time of a predetermined carrier-sensing to transmit gap (CTG) 216, in the same manner as illustrated in FIG. 1. In the environment without interference, data transmission may be continued during a predetermined time interval, without change in the transmission time point of the data being transmitted, until transmission of the consecutive frames is finished.

Conversely, in response to interference 236 occurring during transmission of data or a frame 233 in an environment in which interference exists as in 230 (hereinafter, referred to as 'interference environment'), the low power radio device may vary the transmission time point according to a state of the radio resource, such as a channel.

When the interference 236 occurs during transmission of the consecutive frames, the low power radio device may stand by until the interference 236 ends and restarts the data transmission. In one example, when the state of the radio resource corresponding to the data or frame 233 is idle in a predetermined interframe space, for example, a medium interframe space (MIFS) 239, the low power radio device transmits the data or frame 233 using the corresponding radio resource. The low power radio device may adjust the transmission time point of the frame by detecting the state of the radio resource before transmission of each frame.

A method to transmit consecutive frames in a low power radio device, according to an illustrative example, will be described in detail with reference to FIG. 3.

Figure 3:
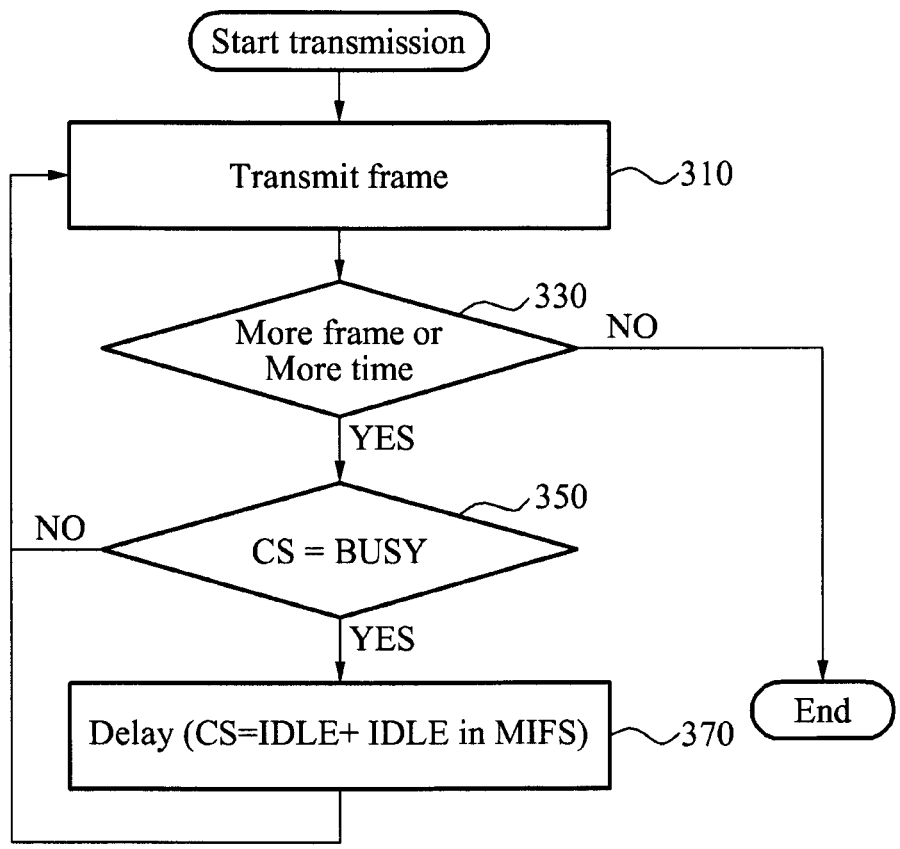
FIG. 3 is a diagram illustrating an example of a method transmitting frames in a low power radio device.

FIG. 3 illustrates a method to transmit frames in a low power radio device according to an illustrative example. Low power radio devices in an interference environment may fail in data transmission because transmission signals of the low power radio devices may not be recognized due to interference generated from other radio devices, in particular, high power radio devices.

Therefore, according to an illustrative example, the low power radio device may adjust the transmission time point according to a channel state detected by carrier sensing and the like, during transmission of the consecutive frames as shown in FIG. 2. A method to adjust the transmission time point will now be described in detail.

The low power radio device transmits any one of a plurality of frames being buffered in 310, and determines transmission availability of another frame in 330. In one example, when the MAC protocol of the low power radio device is CSMA-based, the low power radio device may determine whether a next successive frame exists. In another example, when the MAC protocol is TDMA-based, the low power radio device may determine whether a remaining amount of time, out of a total amount of time allocated to transmit the consecutive frames, is longer than a time to transmit the next frame. When no frames are left to be transmitted, the low power radio device may end the operation.

Conversely, when another successive frame exists in 330, the low power radio device may determine whether the state of the radio resource, for example, a channel state (CS), is busy in 350.

When the CS is determined to be busy in 350, the low power radio device may stand by until the CS becomes idle in 370. In one example, when the CS turns to an idle state and the idle state is maintained for a predetermined duration, for example, during the MIFS 239, the low power radio device goes back to 310 to start transmission of the next frame.

When the CS is determined not to be busy, that is, idle in 350, the low power radio device may go directly to 310 to start transmission of the next frame.

The low power radio device may perform the aforementioned operations until a last frame of the plurality of frames is transmitted.

Although interference may exist, when transmission of the consecutive frames is performed as previously described with respect to FIGS. 2 and 3, the retransmission rate of the low power radio device may be reduced because the transmission time point for the next frame is postponed until the interference ends.

The method of setting the MIFS 239 may be set so that the MIFS 239 is considered or processed to be consecutive interference signals when frames are continuously transmitted. The frames may be continuously transmitted using radio communication protocols or radio devices, which operate as an interference with respect to the transmission signals of the low power radio device. A next frame of the low power radio device is transmitted when transmission of the consecutive interference signals is finished.

For illustrative purposes, the radio communication protocol operating as the interference is referred to be the same as the radio device operating as the interference.

In one example, the radio communication protocols operating as the interference with respect to the transmission signals of the low power radio device may have an interference influence on the low power radio device, but may fail to recognize the transmission signals of the low power radio device as interference.

When a single interference source having a significant interference influence on the transmission signals of the low power radio device exists, the MIFS may be calculated using Equation 1.

$$I\_SIFS + \alpha < MIFS \leq I\_LIFS \quad \text{[Equation 1]}$$

I_SIFS refers to an interframe space in a case in which frames may be continuously transmitted in another wireless connection protocol influencing interference. I_LILFS refers to an interframe space in a case in which radio devices, for example, including at least one low power radio device and at least one high power radio device, may compete with each other for the radio resource in another wireless connection protocol influencing interference. In addition, a refers to a margin time to detect a change in the state of the radio resource.

The low power radio device may set the MIFS 239 using a minimum and a maximum of the interframe space, according to the wireless connection protocol having an influence on a wireless environment. Also, the low power radio device may set the MIFS 239 by further considering the margin time α to detect the change in the state of the radio resource in addition to the minimum (I_SIFS) of the interframe space as in Equation 1.

For example, presuming that I_SIFS is 20 microseconds (μs) and I_LIFS is 50 μs in IEEE 802.11b, the MIFS 239 may be greater than 20+α and equal to or less than 50 μs.

In addition, the low power radio device may adaptively adjust the MIFS according to a change of the interference in the wireless environment.

When a number of wireless connection protocols influencing interference on the transmission signals of the low power radio device is two or more (n>2), the low power radio device may determine I_SIFS and I_LIFS by considering the influence on the wireless environment by the interference of the respective wireless connection protocols as shown in Equation 2.

$$I\_SIFS = \frac{1}{n}\sum_{i=1}^{n} a_i \times I\_SIFS_i$$ [Equation 2]

$$I\_LIFS = \frac{1}{n}\sum_{i=1}^{n} a_i \times I\_LIFS_i$$

In Equation 2, $a_i$ refers to a degree of the interference influence on the low power radio device by the respective wireless protocols. Further, n refers to a number of the wireless connection protocols influencing interference on the transmission signals of the low power radio device.

In Equation 2, $I\_SIFS_i$ may refer to an interframe space in which frames are continuously transmitted in the respective wireless connection protocols. $I\_LIFS_i$ may refer to an interframe space in which the radio devices compete with each other for the radio resource in the respective wireless connection protocols.

In addition, when the number of wireless connection protocols influencing interference on the wireless environment is at least two, the low power radio device may determine the minimum and the maximum of the interframe space by considering an influence of the interference of the respective wireless connection protocols on the wireless environment.

In one aspect, the low power radio device may determine the minimum and the maximum of the interframe space using a weight based on the influence of the interference of the wireless connection protocols on the wireless environment. The weight may be $a_i$ that represents the degree of the interference influence on the low power radio device by the respective wireless protocols.

For example, it may be presumed that a wireless environment including a low power radio device using a wireless body area network (WBAN) also includes a plurality of wireless connection protocols influencing interference on the low power radio device. The wireless connection protocols may include, for example, a wireless local access network (WLAN), Zigbee, Bluetooth, low data rate (LDR), and the like.

Additionally, in one illustrative example, Zigbee may be the wireless connection protocol mainly used in the wireless environment, while the WLAN is the wireless connection protocol having greatest $I\_SIFS_i$ and $I\_LIFS_i$ values. The low power radio device may determine the minimum $I\_SIFS_i$ and the maximum $I\_LIFS_i$ of the interframe space of the low power radio device. The low power radio device would make such determination according to the interframe space of Zigbee, that is, the wireless connection protocol used in the wireless environment or WLAN that is the wireless connection protocol having the greatest $I\_SIFS_i$ and $I\_LIFS_i$ values. In this instance, the low power radio device may set to '1' the degree of the interference influence $a_i$ of Zigbee used in the wireless environment or the WLAN having the greatest $I\_SIFS_i$ and $I\_LIFS_i$ values. The degree of the interference influence $a_i$ of the other wireless connection protocols may be set to '0.'

In response to a share of the wireless connection protocol, such as WLAN, having the greatest $I\_SIFS_i$ and $I\_LIFS_i$ values to be low, the low power radio device may determine the degree of the interference influence $a_i$ to be any value between 0 and 1, considering the share. As a result, the low power radio device may increase the transmission efficiency.

In addition, the low power radio device may determine the minimum and the maximum of the interframe space in the following manner.

The low power radio device may set different weights according to the wireless connection protocols, and calculate a minimum mean value and a maximum mean value of the interframe space based on the different weights.

Next, the low power radio device may set the minimum mean value as the minimum of the interframe space and set the maximum mean value as the maximum of the interframe space.

The low power radio device may adaptively vary the MIFS by varying the degree of the interference influence $a_i$ as the wireless environment changes.

In one example, when a mainly used wireless connection protocol is changed because a new radio device is added or an existing radio device is moved in the wireless environment, such a case may be considered a change of the wireless environment.

Figure 4:
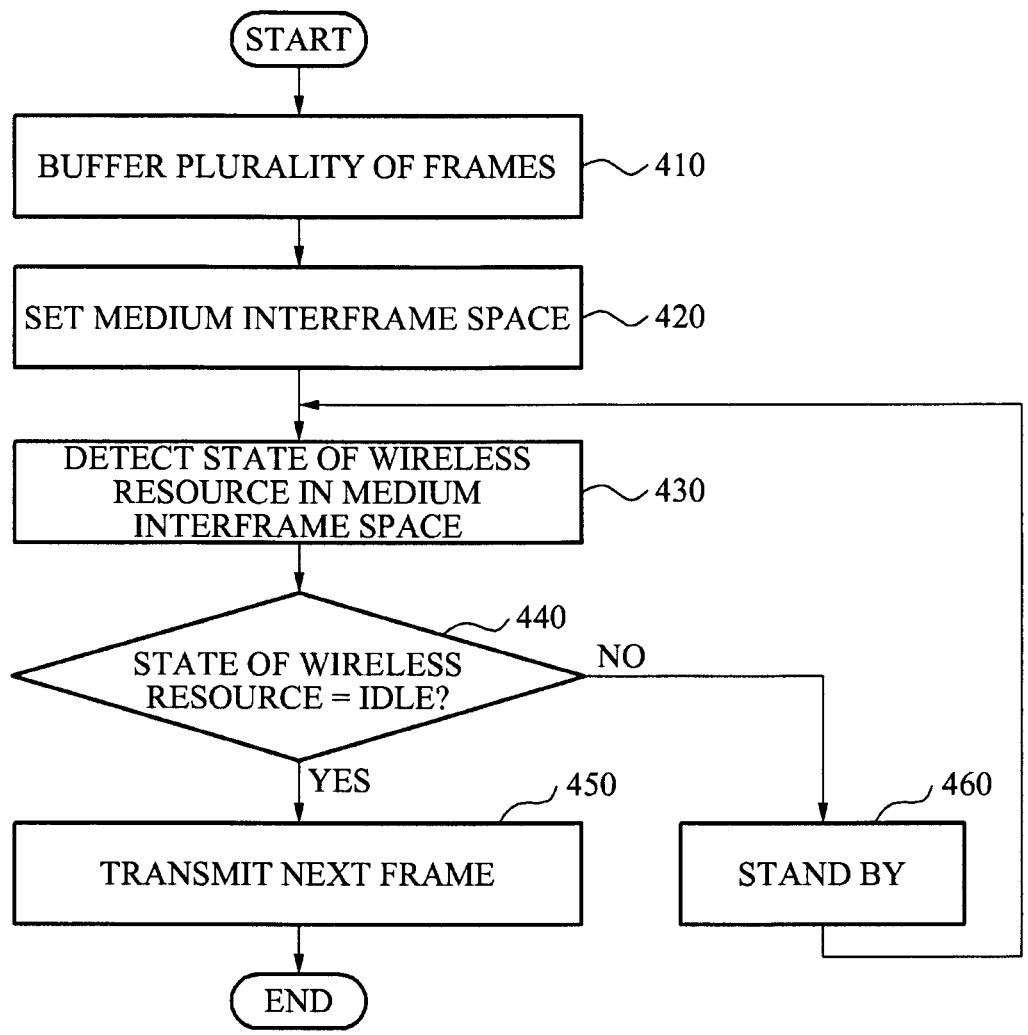
FIG. 4 is a flowchart illustrating an example of a radio resource sharing method.

FIG. 4 illustrates a flowchart showing a radio resource sharing method in a low power radio device, according to an illustrative example. The radio resource sharing method in a wireless environment including at least one low power radio device and at least one high power radio device will now be described.

In 410, the low power radio device may buffer a plurality of frames being continuously transmitted.

In 430, the low power radio device may detect a state of a radio resource corresponding to a next frame in an MIFS. The radio resource is used after transmitting any one frame of the plurality of frames. In one aspect, the low power radio device may detect the state of the radio resource before transmission of each frame.

In 420, the low power radio device may set the MIFS. However, the order of the setting, although suggested, is not specifically limited. That is, the MIFS may be set or changed according to a change in the wireless environment, at any time before detection of the state of the radio resource. Various methods for setting the MIFS in the low power radio device are described with reference to FIG. 3.

In 430, the low power radio device may detect the state of the radio resource corresponding to the next frame in the MIFS.

When the state of the radio resource is idle as a result of 430, the low power radio device may transmit the next frame using the radio resource in 450. Conversely, when the state of the radio resource corresponding to the next frame in the MIFS is not idle, that is, it is busy, the low power radio device may be on stand-by until the state of the radio resource becomes idle in 460. When the state of the radio resource turns to an idle state and the idle state is maintained for a duration of the MIFS in 430 and 440, the low power radio device may transmit the next frame that is in a stand-by state in 450.

When transmission of consecutive frames is performed in the foregoing manner, frame transmission time may be increased. However, retransmission rate of the frames caused by the interference may be reduced because an energy required for retransmitting the frames may be lower than an energy required for carrier sensing. Carrier sensing may be detecting the state of the radio resource. An energy gain of the low power radio device is increased in response to a transmission power of the low power radio device being greater than a reception power, in response to a carrier sensing power being lower, and in response to quantity of interference with respect to transmission signals of the low power radio device being greater.

It is to be understood that in the embodiment of the present invention, the operations in FIG. 4 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIG. 4.

Figure 5:
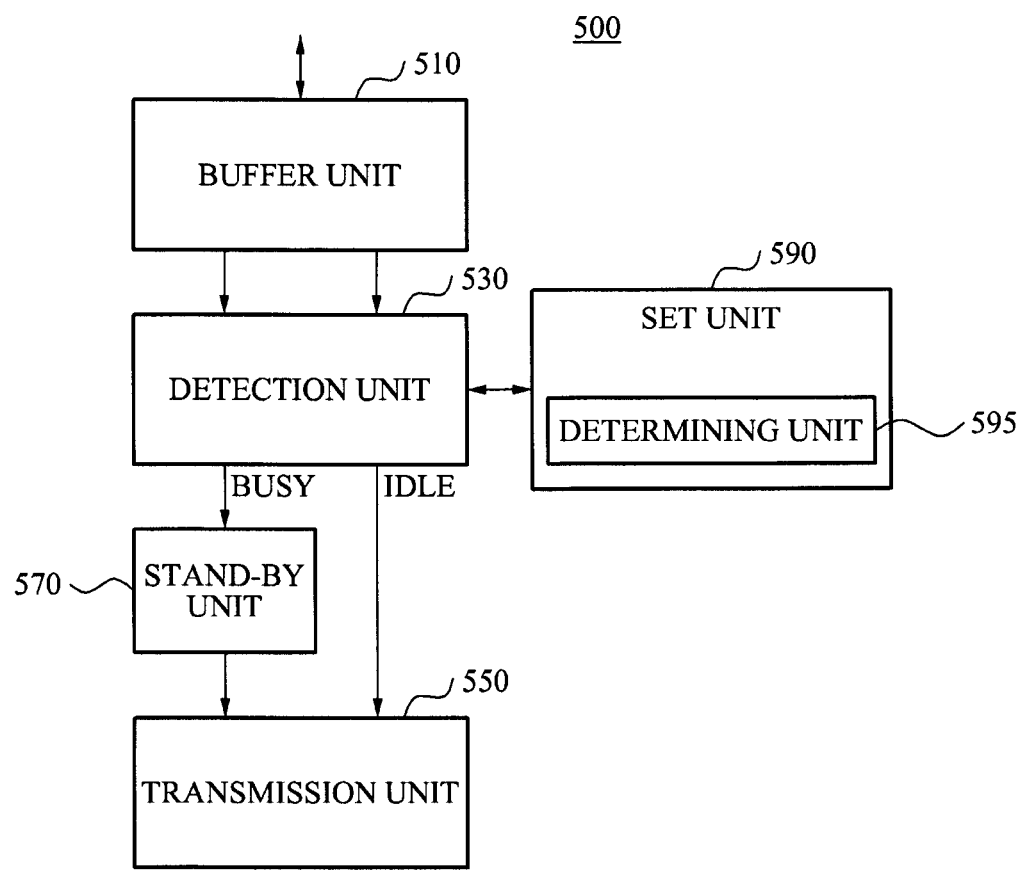
FIG. 5 is a block diagram illustrating an example of a low power radio device.

FIG. 5 illustrates a block diagram showing a low power radio device 500 according to an illustrative example.

The low power radio device 500 includes a buffer unit 510, a detection unit 530, and a transmission unit 550. The low power radio device 500 may further include a stand-by unit 570 and a set unit 590.

The buffer unit 510 may buffer a plurality of frames being continuously transmitted.

The detection unit 530 may detect a state of a radio resource corresponding to a next frame in an MIFS in order to use the radio resource after transmission of any one frame of the plurality of frames. The detection unit 530 may detect the state of the radio resource with respect to every frame.

When the state of the radio resource corresponding to the next frame is idle in the MIFS, the transmission unit 550 may transmit the next frame using the radio resource.

When the state of the radio resource corresponding to the next frame is busy in the MIFS, the stand-by unit 570 may place the next frame on stand-by until the state of the radio resource becomes idle.

Therefore, when the state of the radio resource turns to an idle state from a busy state and the idle state is maintained for a duration of the MIFS, the next frame standing by in the stand-by unit 570 may be transmitted through the transmission unit 550.

In one illustrative example, the set unit 590 may set the MIFS. In response to setting the MIFS, the set unit 590 may use a minimum and a maximum of an interframe space according to a wireless connection protocol influencing interference on a wireless environment.

The set unit 590 may further include a determining unit 595. In an illustrative example, in an event that there are at least two wireless connection protocols influencing interference on the wireless environment, the determining unit 595 may determine the minimum and the maximum of the interframe space by considering the influence on the wireless environment by an interference of the at least two wireless connection protocols.

The determining unit 595 may determine the minimum and the maximum of the interframe space, using a weight based on the interference on the wireless environment by the interference of the wireless connection protocols.

The buffer unit 510, the detection unit 530, the set unit 590, the determining unit 595, the stand-by unit 570, and the transmission unit 550 described in FIG. 5 may be implemented using hardware and software components, for example, processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Furthermore, buffer unit 510, the detection unit 530, the set unit 590, the determining unit 595, the stand-by unit 570, and the transmission unit 550 described in FIG. 5 may be implemented as individual structural components or one or more integrated structural components.

According to an illustrative aspect, it is possible to reduce a retransmission rate caused by the interference by detecting a state of a channel before transmission of each frame, thereby reducing energy consumption of a low power radio device.

Additionally, according to embodiments of the present invention, in a communication environment including various interferences caused by various wireless connection protocols, such as a WLAN, Zigbee, Bluetooth, LDR, and the like, the low power radio device may transmit frames more efficiently.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, unit, device, or circuit are combined in a different manner and/or replaced or supplemented by other components or their equivalents. Accordingly, other implementations are within the scope of the following claims.

What is claimed is:

1. A radio resource sharing method for a low power radio device in a wireless environment, the method comprising:
   buffering a plurality of frames being continuously transmitted;
   detecting a state of a radio resource corresponding to a next frame in a medium interframe space (MIFS) using the radio resource after transmission of a frame of the plurality of frames, wherein the MIFS is set based on characteristics of a wireless connection protocol that interferes with the wireless environment, wherein the characteristics of the wireless connection protocol comprise values of a short interframe space (SIFS) and a long interframe space (LIFS) of the wireless connection protocol; and
   transmitting the next frame using the radio resource in response to the state of the radio resource being idle in the MIFS, wherein the MIFS is adaptively adjusted by varying a degree of interference influence selected considering a share according to a change of an interference in the wireless environment.

2. The radio resource sharing method of claim 1, wherein the detecting of the state of the radio resource comprises:
   detecting the state of the radio resource with respect to each frame.

3. The radio resource sharing method of claim 1, further comprising:
   standing by until the state of the radio resource becomes idle when the state of the radio resource corresponding to the next frame is busy in the MIFS.

4. The radio resource sharing method of claim 1, further comprising:
   setting the MIFS.

5. The radio resource sharing method of claim 4, wherein the setting of the MIFS comprises:
   setting the MIFS using a minimum and a maximum of an interframe space according to the wireless connection protocol.

6. The radio resource sharing method of claim 5, wherein the setting of the MIFS further comprises:
   setting the MIFS by considering a margin time to recognize a change in the state of the radio resource in addition to the minimum of the interframe space.

7. The radio resource sharing method of claim 5, wherein the setting of the MIFS further comprises:
   determining the minimum and the maximum of the interframe space by considering an influence on the wireless environment by an interference of wireless connection protocols when a number of wireless connection protocols influencing interference on the wireless environment is at least two.

8. The radio resource sharing method of claim 7, wherein the determining of the minimum and the maximum of the interframe space comprises:
   setting different weights with respect to the respective wireless connection protocols;
   calculating a minimum mean value and a maximum mean value of the interframe space based on the different weights; and
   setting the minimum mean value and the maximum mean value of the interframe space as the minimum and the maximum of the interframe space.

9. The radio resource sharing method of claim 7, further comprising:
   setting an interframe space in response to the frames being continuously transmitted in the wireless connection protocols as the minimum of the interframe space.

10. The radio resource sharing method of claim 7, further comprising:
    setting an interframe space as the maximum of the interframe space in response to a low power radio device and a high power radio device competing to acquire the radio resource in the wireless connection protocols.

11. The radio resource sharing method of claim 5, wherein the setting of the MIFS comprises:
    when two or more wireless connection protocols interfere with the wireless environment, determining the minimum and the maximum based on a weighted average of respective interframe spaces of the two or more wireless connection protocols.

12. The radio resource sharing method of claim 11, further comprising:
    varying a weight to calculate the weighted average according to a change in the wireless environment.

13. A non-transitory computer-readable recording medium storing a program to cause a computer to implement the method of claim 1.

14. The radio source sharing method of claim 1, wherein the characteristics of the wireless connection protocol comprise a degree of interference that the wireless connection protocol influences on the low power radio device.

15. The radio source sharing method of claim 1, wherein the characteristics of the wireless connection protocol comprise a degree of power needed to use the wireless connection protocol.

16. A low power radio device in a wireless environment, the low power radio device comprising:
    a buffer unit configured to buffer a plurality of frames being continuously transmitted;
    a detection unit configured to detect a state of a radio resource corresponding to a next frame in a medium interframe space (MIFS) using the radio resource after transmission of a frame of the plurality of frames, wherein the MIFS is set based on characteristics of a wireless connection protocol that interferes with the wireless environment, wherein the characteristics of the wireless connection protocol comprise values of a short interframe space (SIFS) and a long interframe space (LIFS) of the wireless connection protocol; and
    a transmission unit configured to transmit the next frame using the radio resource in response to the state of the radio resource being idle in the MIFS, wherein the MIFS is adaptively adjusted by varying a degree of interference influence selected considering a share according to a change of an interference in the wireless environment.

17. The low power radio device of claim 16, wherein the detection unit is configured to detect the state of the radio resource with respect to each frame.

18. The low power radio device of claim 16, further comprising:
    a stand-by unit configured to stand-by until the state of the radio resource becomes idle when the state of the radio resource corresponding to the next frame is busy in the MIFS.

19. The low power radio device of claim 16, further comprising a set unit to set the MIFS.

20. The low power radio device of claim 19, wherein the set unit sets the MIFS using a minimum and a maximum of an interframe space according to the wireless connection protocol interfering with the wireless environment.

21. The low power radio device of claim 20, wherein the set unit further comprises:
    a determining unit configured to determine the minimum and the maximum of the interframe space by considering an influence on the wireless environment by an interference of wireless connection protocols when a number of wireless connection protocols influencing interference on the wireless environment is at least two.

22. The low power radio device of claim 20, wherein the set unit further comprises:
a determining unit configured, when two or more wireless connection protocols interfere with the wireless environment, to determine the minimum and the maximum of the interframe space based on a weighted average of respective interframe spaces of the two or more wireless connection protocols.

23. A radio resource sharing method in a low power radio device, comprising:
detecting a state of a radio resource corresponding to a next frame in a medium interframe space (MIFS), the radio resource being used after transmitting one of the frames, and the MIFS being set based on characteristics of a wireless connection protocol that interferes with a wireless environment in which the device is located, wherein the characteristics of the wireless connection protocol comprise values of a short interframe space (SIFS) and a long interframe space (LIFS) of the wireless connection protocol;
in response to the state of the radio resource being idle in the MIFS, transmitting the next frame using the radio resource; and
in response to the state of the radio resource being busy in the MIFS, placing the state of the radio resource to be on stand-by until the state of the radio resource is idle, wherein the MIFS is adaptively adjusted by varying a degree of interference influence selected considering a share according to a change of an interference in the wireless environment.

24. A low power radio device in a wireless environment, comprising:
a detection unit configured to detect a state of a radio resource corresponding to a next frame in a medium interframe space (MIFS), the radio resource being used after transmitting one of the frames, and the MIFS being set based on characteristics of a wireless connection protocol that interferes with the wireless environment, wherein the characteristics of the wireless connection protocol comprise values of a short interframe space (SIFS) and a long interframe space (LIFS) of the wireless connection protocol; and
a transmission unit configured to transmit the next frame using the radio resource in response to the state of the radio resource being idle in the MIFS, and configured to place the state of the radio resource to be on stand-by until the state of the radio resource is idle in response to the state of the radio resource being busy in the MIFS, wherein the MIFS is adaptively adjusted by varying a degree of interference influence selected considering a share according to a change of an interference in the wireless environment.

* * * * *